(12) United States Patent
Wang et al.

(10) Patent No.: US 8,542,905 B2
(45) Date of Patent: *Sep. 24, 2013

(54) DETERMINING THE UNIQUENESS OF A MODEL FOR MACHINE VISION

(75) Inventors: Xiaoguang Wang, Alpharetta, GA (US); Lowell Jacobson, Grafton, MA (US)

(73) Assignee: Cognex Corporation, Natick, MA (US)

( * ) Notice: Subject to any disclaimer, the term of this patent is extended or adjusted under 35 U.S.C. 154(b) by 213 days.

This patent is subject to a terminal disclaimer.

(21) Appl. No.: 12/981,268

(22) Filed: Dec. 29, 2010

(65) Prior Publication Data

US 2012/0170834 A1 Jul. 5, 2012

(51) Int. Cl.
*G06K 9/62* (2006.01)
*G06K 9/46* (2006.01)
*G06T 17/00* (2006.01)
*G06F 15/18* (2006.01)

(52) U.S. Cl.
USPC ........... 382/141; 382/155; 382/190; 345/420; 706/12

(58) Field of Classification Search
USPC ............... 382/118, 159, 154, 151, 103, 218, 382/190, 228, 155, 124, 115, 141; 345/419, 345/420, 473, 474; 703/2; 340/5.53, 5.52; 706/12; 713/186
See application file for complete search history.

(56) References Cited

U.S. PATENT DOCUMENTS
2007/0005311 A1 1/2007 Wegerich et al.

FOREIGN PATENT DOCUMENTS
WO 2005006278 1/2005

OTHER PUBLICATIONS

"What's New in Vision Builder AI 2009," (Feb. 8, 2010), 5 pages, Retrieved from the Internet <http://zone.ni.com/devzone/cda/tut/p/id/10430>.
International Search Report and Written Opinion of the International Searching Authority, dated Aug. 7, 2012 (9 pages).

*Primary Examiner* — Sheela Chawan
(74) *Attorney, Agent, or Firm* — Proskauer Rose LLP

(57) ABSTRACT

Described are methods and apparatuses, including computer program products, for determining model uniqueness with a quality metric of a model of an object in a machine vision application. Determining uniqueness involves receiving a training image, generating a model of an object based on the training image, generating a modified training image based on the training image, determining a set of poses that represent possible instances of the model in the modified training image, and computing a quality metric of the model based on an evaluation of the set of poses with respect to the modified training image.

20 Claims, 8 Drawing Sheets

DETERMINING THE UNIQUENESS OF A MODEL FOR MACHINE VISION

TECHNICAL FIELD

The description generally relates to computer-implemented methods and systems, including machine vision systems and computer program products, for determining the uniqueness of a model for machine vision.

BACKGROUND

Machine vision generally relates to finding and/or locating patterns in images, where the patterns generally correspond to and/or represent real-world objects in the field of view of an imaging device, whether based on an image of the object or a simulated representation of the object, such as a CAD drawing. Pattern location methods and systems are of particular importance in industrial automation, where they are used, for example, to guide automation equipment and for quality control, where the objects might include, for example, semiconductor wafers, automotive parts, pharmaceuticals, etc. Machine vision enables quicker, more accurate and repeatable results to be obtained in the production of both mass-produced and custom products. Basic machine vision systems include one or more cameras (typically having solid-state charge couple device (CCD) as imaging elements) directed at an area of interest, appropriate illumination on the area of interest, frame grabber/image processing elements that capture and/or transmit CCD images, and one or more computer processing units and/or displays for running the machine vision software application and manipulating or analyzing the captured images.

Typical machine vision systems include a training stage and a run-time stage. Training typically involves being provided or receiving a digital image of an example object (e.g., a training image). The objective of training is to learn an object's pattern in an image by generating a model that can be used to find similarly-appearing patterns on production objects or in run-time images at run-time. Run-time typically involves being provided or receiving a digital image of a production object (e.g., a run-time image). The objective of run-time processing is (1) to determine whether the pattern exists in the run-time image (called pattern recognition), and (2) if the pattern is found, to determine where the pattern is located, with respect to one or more degrees of freedom (DOF), within the run-time image. The pattern's location, as defined by the DOFs, can be called the object or pattern's pose in the image. One way to represent a pose is as a transformation matrix mapping between coordinates in the model and coordinates in the run-time image or vice versa. Determining whether a pattern is located in an image can establish the location of the production object so that, for example, it can be operated on by automation equipment.

Training is one of the more important and challenging aspects of any industrial pattern inspection/location system. In a typical production application, for example, a model can be used tens of thousands of times every hour, and any errors or imperfections in the model can potentially affect every single use. The challenge of training arises from several factors. Production objects can vary significantly in appearance from any given example object used in training, due to imperfections in the example object and ordinary manufacturing variations in the production objects and/or the lighting conditions. Nevertheless, the model should be such that the production objects can be found reliably and accurately, while at the same time rejecting objects that do not match the pattern.

In addition, models are typically trained by human operators (e.g., by drawing a box on a training image with a mouse) whose time is expensive and who are not generally experts in the underlying machine vision technology. Alternatively, machine vision systems also allow models to be defined synthetically (e.g., by using a CAD tool). Each of these training implementations suffers from drawbacks that can decrease the effectiveness of the generated models. For example, manually-selected and synthetically-generated models can result in degenerate models (e.g., straight lines) and other non-unique model features. Training machine vision systems based on object images is also typically time-consuming. This becomes especially a problem for manufacturing processes, where there may be a wide variety of products and/or objects that need to be inspected and/or localized using machine vision inspection. Furthermore, product designs may frequently change. Even a minor revision to an object, for example, its shape, may require retraining.

FIGS. 1A-1C illustrate examples of manually trained models from training images and the resulting mis-detections during run-time using the manually-generated models. FIG. 1A illustrates a training image 110 and a user-selected region of interest 111 from which a model 112 is generated (e.g., the region of interest is passed through an edge detection unit to generate a model representing edges). However, model 112 contains only straight lines 112a and 112b in the same direction, which are degenerate and non-unique features, resulting in a secondary result 115 being detected in a run-time image 116. The detected result 115 matches the model features, but is translated and therefore does not represent what the user intended to find. Similarly, FIG. 1B illustrates the training image 110 with a different user-selected region of interest 117 from which a model 118 is generated. Model 118, while non-degenerate, still can result in a degenerate match 119 in the run-time image 120 even though a portion 120 of the model 119 does not appear in the run-time image 120. FIG. 1C illustrates a training image 130 and two user-selected regions of interest 131 from which a model 132 is generated. However, models such as model 132 that include a circle 132a and/or short straight lines 132b oriented in a single direction can be non-unique by rotation, resulting in a secondary result 135 being detected in run time image 136 (where the highlight box 137 illustrates the rotation of the secondary result 135. In other examples, models can be non-unique due to the existence of background features.

One approach to determining the uniqueness of a model involves analyzing all of the results returned during run-time application of the model (e.g., determining how many mis-detections occur). The drawback of this approach is failure to detect secondary results (e.g., results that are not the highest scoring or do not surpass a certain threshold score) in a robust manner due to the existence of non-linearities of the machine vision tools used. Other approaches include simple alerts based on whether a model consists of a single straight line or a single circle. The drawback of these approaches is that they do not address the general issue of how unique a model is in a given search range.

SUMMARY

Existing solutions to training machine vision systems do not allow for quality control in generating robust models and, thus, provide an incomplete and unsatisfactory commercial solution. Thus, an approach to training in machine vision systems and methods that determines the uniqueness of a model is desirable. It is also desirable to facilitate quick choices regarding the uniqueness of a model to be made with little or no required judgment by an operating user.

One approach to determining uniqueness of a model involves calculating and evaluating a quality metric of the model. One approach to calculate a quality metric is to perturb the training image and evaluate the perturbed results. Evaluation of the perturbed results can be based on a statistical analysis of the secondary scores associated with the perturbed results.

In one aspect, there is a computerized method for determining a quality metric of a model of an object in a machine vision application. The method includes receiving a training image, generating a model of an object based on the training image, generating a modified training image based on the training image, determining a set of poses that represent possible instances of the model in the modified training image, and computing a quality metric of the model based on an evaluation of the set of poses with respect to the modified training image.

In another aspect, there is a computer program product. The computer program product is tangibly embodied in a machine-readable storage device and includes instructions being operable to cause data processing apparatus to receive a training image, generate a model of an object based on the training image, generate a modified training image based on the training image, determine a set of poses that represent possible instances of the model in the modified training image, and compute a quality metric of the model based on an evaluation of the set of poses with respect to the modified training image.

Another aspect features a system for determining a quality metric of a model of an object in a machine vision application. The system includes interface means for receiving a training image, model generating means for generating a model of an object based on the training image, image modifying means for generating a modified training image based on the training image, processor means for determining a set of poses that represent possible instances of the model in the modified training image, and processor means for computing a quality metric of the model based on an evaluation of the set of poses with respect to the modified training image.

Another aspect features a system for determining a quality metric of a model of an object in a machine vision application. The system includes an interface for receiving a training image, a model generating module for generating a model of an object based on the training image, an image processing module for generating a modified training image based on the training image, a run-time module for determining a set of poses that represent possible instances of the model in the modified training image, and a quality-metric module for computing a quality metric of the model based on an evaluation of the set of poses with respect to the modified training image.

In other examples, any of the aspects above can include one or more of the following features. The method can further include computing at least a primary score and a secondary score for at least a portion of the set of poses. Computing the quality metric can be based on the primary score and the secondary score. Computing the quality metric can be based on a distribution of the computed scores for the portion of the set of poses. The model can include a geometric description of the object in the training image. The model can include a portion of the training image. Generating the modified training image can include adding noise to the training image. The noise can include amplifier noise, salt-and-pepper noise, shot noise, quantization noise, film grain noise, non-isotropic noise, or any combination thereof. The noise can be added to one or more pixels in the training image. Generating the modified training image can include transforming the training image by one or more degrees-of-freedom of rotation, translation, scale, skew, aspect ratio, or any combination thereof. Generating the modified training image can include changing the resolution of the training image.

In some embodiments, the method further includes generating a plurality of modified training images based on the training image. The method can further include determining a set of poses for each of the plurality of modified training images. Each set of poses can represent possible instances of the model in one of the plurality of modified training images. Computing the quality metric can be further based on an evaluation of the sets of poses, determined from the plurality of modified training images, with respect to the modified training image. The method can further include computing at least primary scores and secondary scores for at least a portion of the set of poses and at least portions of each of the sets of poses computed from the plurality of modified training images. Computing the quality metric of the model can be based on the secondary scores. Computing the quality metric of the model can be based on a distribution of the computed scores for the portion of the set of poses and distributions of the computed scores for the portions of the sets of poses computed from the plurality of modified training images. The method can further include modifying a baseline model parameter. Generating the model can be based on the modified baseline model parameter. The baseline model parameter can include an elasticity parameter, a grain limit or granularity, a coarse-value acceptance fraction, a contrast threshold, an edge-value threshold, trainClientFromPattern, or any combination thereof.

Another approach to calculating a quality metric of a model is to perturb model parameters in lieu of or in addition to perturbing a training image and evaluate the perturbed results. In one aspect, there is a computerized method for determining a quality metric of a model of an object in a machine vision application. The method includes receiving a training image and a first set of model parameters, generating a first model of an object, generating a second model of the object based on the training image and a second set of model parameters modified from the first set of model parameters, determining a set of poses that represent possible instances of the second model in the training image, and computing a quality metric of the first model based on an evaluation of the set of poses with respect to the training image.

In another aspect, there is a computer program product. The computer program product is tangibly embodied in a machine-readable storage device and includes instructions being operable to cause data processing apparatus to receive a training image and a first set of model parameters, generate a first model of an object, generate a second model of the object based on the training image and a second set of model parameters modified from the first set of model parameters, determine a set of poses that represent possible instances of the second model in the training image, and compute a quality metric of the first model based on an evaluation of the set of poses with respect to the training image.

Another aspect features a system for determining a quality metric of a model of an object in a machine vision application. The system includes interface means for receiving a training image and a first set of model parameters, model generating means for generating a first model of an object, model generating means for generating a second model of the object based on the training image and a second set of model parameters modified from the first set of model parameters, processor means for determining a set of poses that represent possible instances of the second model in the training image, and processor means for computing a quality metric of the first model based on an evaluation of the set of poses with respect to the training image.

Another aspect features a system for determining a quality metric of a model of an object in a machine vision application. The system includes an interface for receiving a training image and a first set of model parameters, a model generating module for generating a first model of an object and for generating a second model of the object based on the training image and a second set of model parameters modified from the first set of model parameters, a run-time module for determining a set of poses that represent possible instances of the second model in the training image, and a quality-metric module for computing a quality metric of the first model based on an evaluation of the set of poses with respect to the training image.

In other examples, any of the aspects above can include one or more of the following features. Modifying the first set of model parameters to produce the second set of model parameters can include perturbing one or more values in the first set of model parameters. The model can include a geometric description of the object in the training image. The model can include a portion of the training image. The method can further include computing at least a primary score and a secondary score for at least a portion of the set of poses. Computing the quality metric of the model can be based on the primary score and the secondary score. Computing the quality metric of the model can be based on a distribution of the computed scores for the portion of the set of poses.

In some embodiments, the method further includes generating a plurality of models based on the training image and a plurality of different sets of model parameters. The plurality of different sets of model parameters can be based on modifications to the first set of model parameters. The method can further include determining a set of poses for each of the plurality of models. Each set of poses can represent possible instances of one of the plurality of models in the training image. Computing the quality metric can be further based on an evaluation of the sets of poses, for each of the plurality of models, with respect to the training image. The method can further include computing at least primary scores and secondary scores for at least a portion of the first set of poses and at least portions of the sets of poses computed for each of the plurality of models. Determining the quality metric of the model can be based on the secondary scores. Determining the quality metric of the model can be based on a distribution of the computed scores for the portion of the first set of poses and distributions of the computed scores for the portions of the sets of poses computed for each of the plurality of models.

In some embodiments, the method further includes modifying the training image. Modifying the received training image can include adding noise to the received training image. Determining the set of poses can include modifying one or more search parameters. The one or more search space parameters can include a starting pose value, one or more search range values, or any combination thereof.

Any of the above implementations can realize one or more of the following advantages. Simulating a variety of run-time-like applications of a generated model on modified training images and/or using perturbed training parameters advantageously allows the uniqueness of the model to be determined in a non-time sensitive manner, e.g., during training. Providing models with a higher degree of uniqueness provides greater reliability (e.g., minimizes error rates, mis-detection and spurious results during run-time). Automatically determining the uniqueness of a model also helps naïve users, who otherwise may have picked non-unique models, to pick models likely to result in fewer errors at run-time.

In other examples, any of the features above relating to a method can be performed by a system, and/or a controller of the system, configured to or having means for performing the method. In addition, any of the features above relating to a method can be performed by a computer program product including instructions being operable to cause data processing apparatus to perform the method. Any of the above aspects can include any of the above embodiments. In one implementation, any of the above-aspects includes the features of each of the embodiments.

The details of one or more examples are set forth in the accompanying drawings and the description below. Further features, aspects, and advantages of the invention will become apparent from the description, the drawings, and the claims. The drawings are not necessarily to scale, emphasis instead generally being placed upon illustrating the principles of the invention.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Figure 1A:
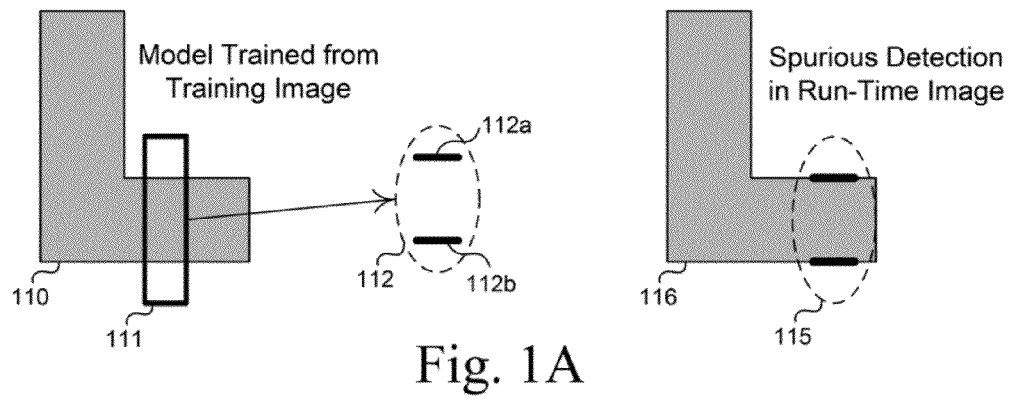
FIGS. 1A-1C illustrate examples of manually trained models from training images and the resulting mis-detections during run-time using the manually-generated models.
Figure 1B:
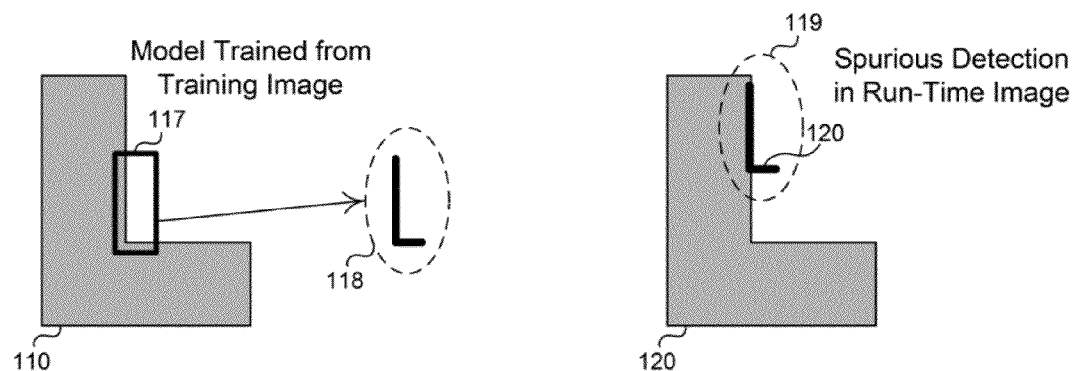
Figure 1C:
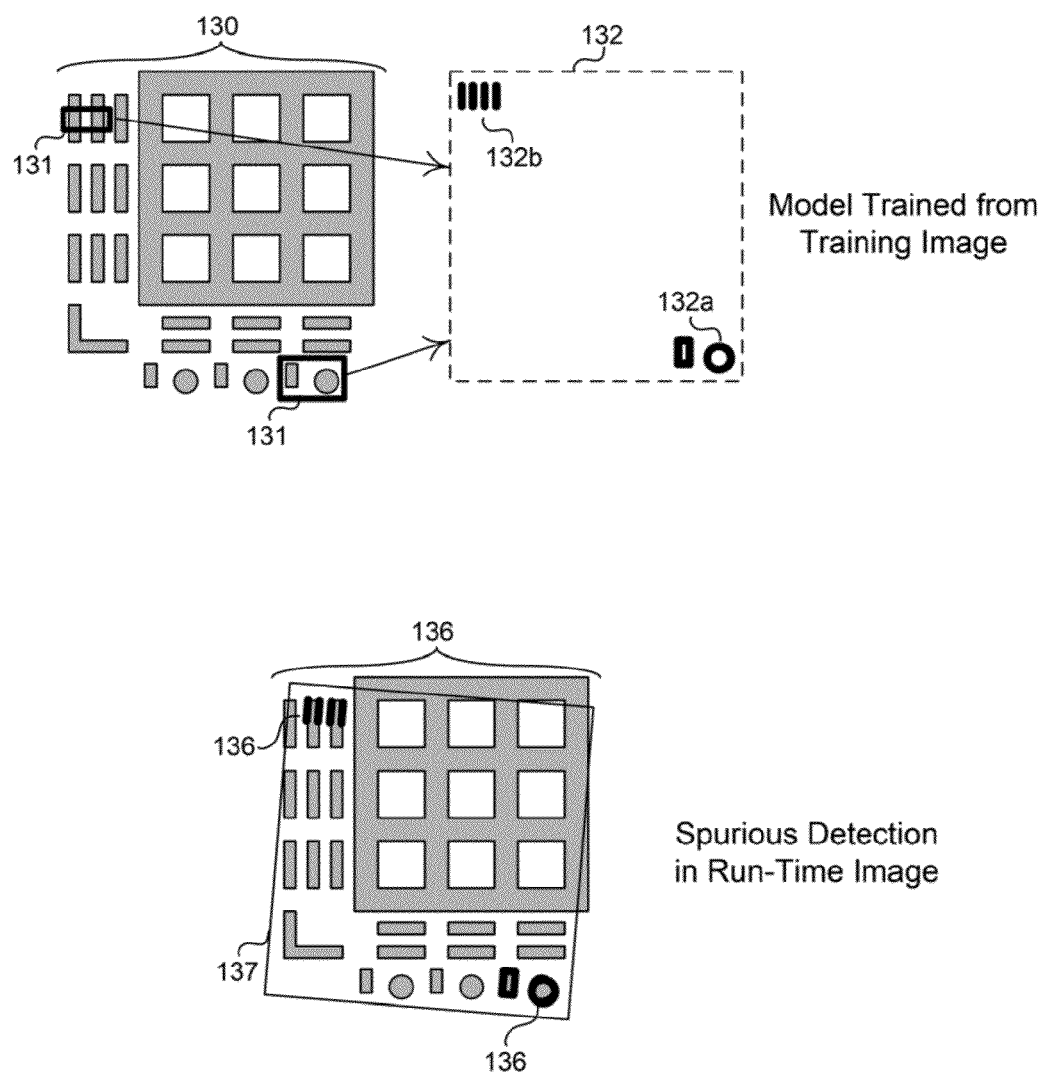
Figure 2:
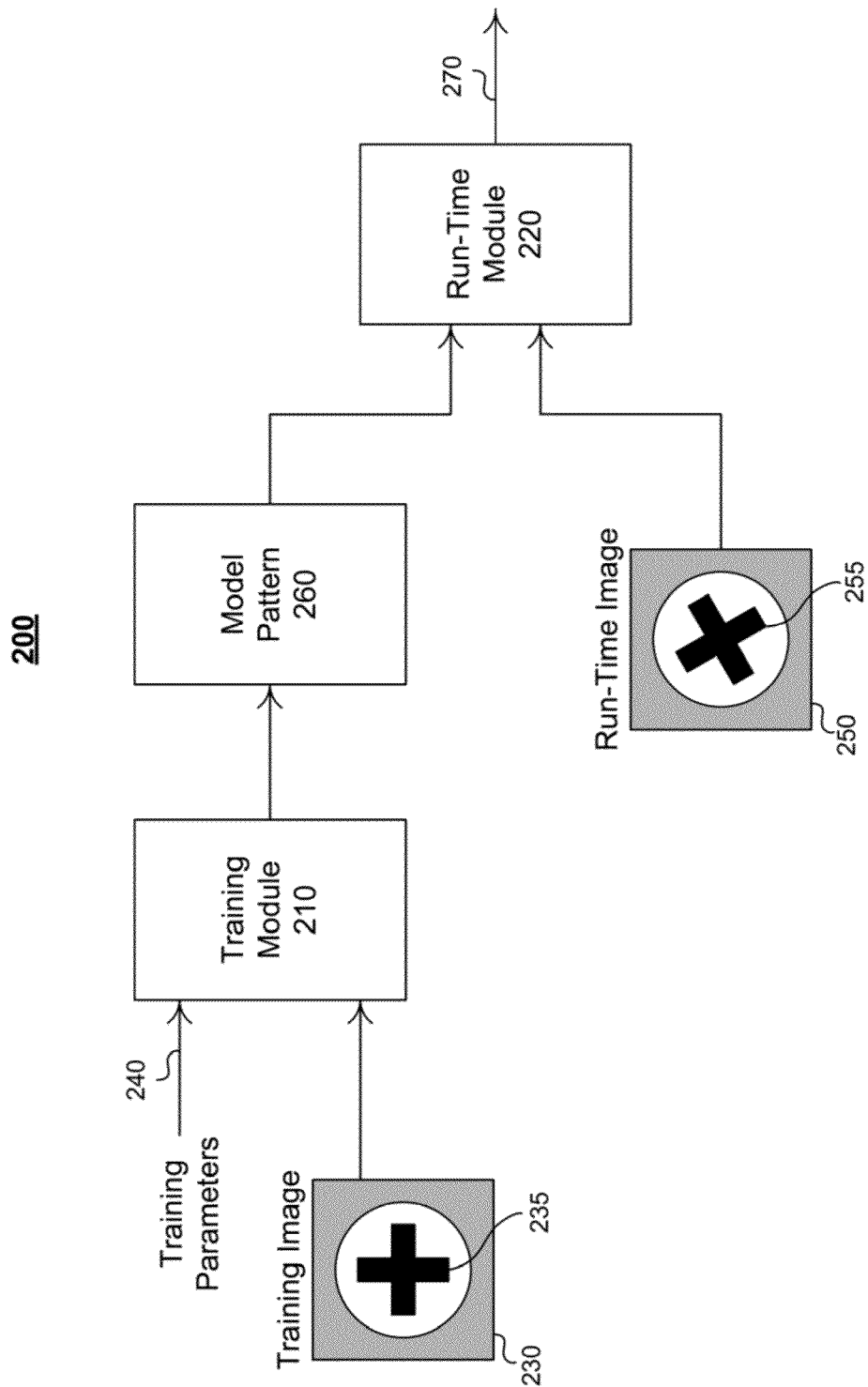
FIG. 2 illustrates a high-level block diagram of a machine vision tool.

FIG. 2 illustrates a high-level block diagram of a machine vision tool 200. The machine vision tool 200 includes a training module 210 and a run-time module 220. Training module 210 can be provided with and receives as input a digital image 230 (e.g., a training image). Training image 230 includes the object 235 that is of interest (in this example, a circle containing a cross or fiducial mark that can be used for alignment and location purposes). Training module 210 also receives as input one or more training parameters 240. Run-time module 220 can be provided with and receives as input a run-time image 250 and a model 260 generated by training module 210.

Generally, training module 210 implements the process of learning the pattern to be found and generating a model 260 for use by run-time module 220. FIG. 2 illustrates model 260 being trained from a training image 230, but other processes can also be used. For example, models 260 can be generated synthetically from any description of a real-world object such as from CAD data describing an idealized appearance of the real-world object. In the training step 210, the pattern 235 that is of interest is processed into a usable model 260. In some embodiments, model 260 can include a shape-based description of the shape of the pattern (e.g., a geometric description). In some embodiments, a geometric model 260 can be generated using the teachings of U.S. Pat. No. 7,016,539 "Method for Fast, Robust, Multi-Dimensional Pattern Recognition," and/or U.S. Pat. No. 7,088,862 "Fast High-Accuracy Multi-Dimensional Pattern Inspection," each of which are herein incorporated by reference in their entirety. In some embodiments, model 260 can include an image-based description of the shape of the pattern (e.g., a two-dimensional array of pixel brightness values as used in, e.g., normalized correlation-type applications or a set of regions of interest in an image).

In the run-time module 220, run-time images 250 are analyzed to produce inspection and/or localization information 270. For example, localization information 270 can include a pose of the pattern 255 within the run-time image 250. The pose of a pattern, e.g., the location of the pattern within the run-time image, specifies how the pattern is positioned with respect to one or more degrees-of-freedom (DOF) (e.g., translational and/or generalized DOF). Translational DOFs refer, for example, to the horizontal and vertical location of the pattern in the run-time image. Generalized DOFs refer, for example, to the rotation, aspect ratio, and/or skew of the pattern in the run-time image. Given a model, the pose of the pattern in the run-time image specifies the transformation operations (e.g., x-coordinate translation, y-coordinate translation, rotation, etc.) that are performed on the model to match the run-time pattern, and/or vice versa. Similarly, the pose can also be used to transform from run-time coordinates to model coordinates (or vice versa). In some embodiments, the PatMax™ and/or PatQuick™ tools, sold by Cognex Corp., Natick, Mass., are used in cooperation with the run-time module 220.

Figure 3A:
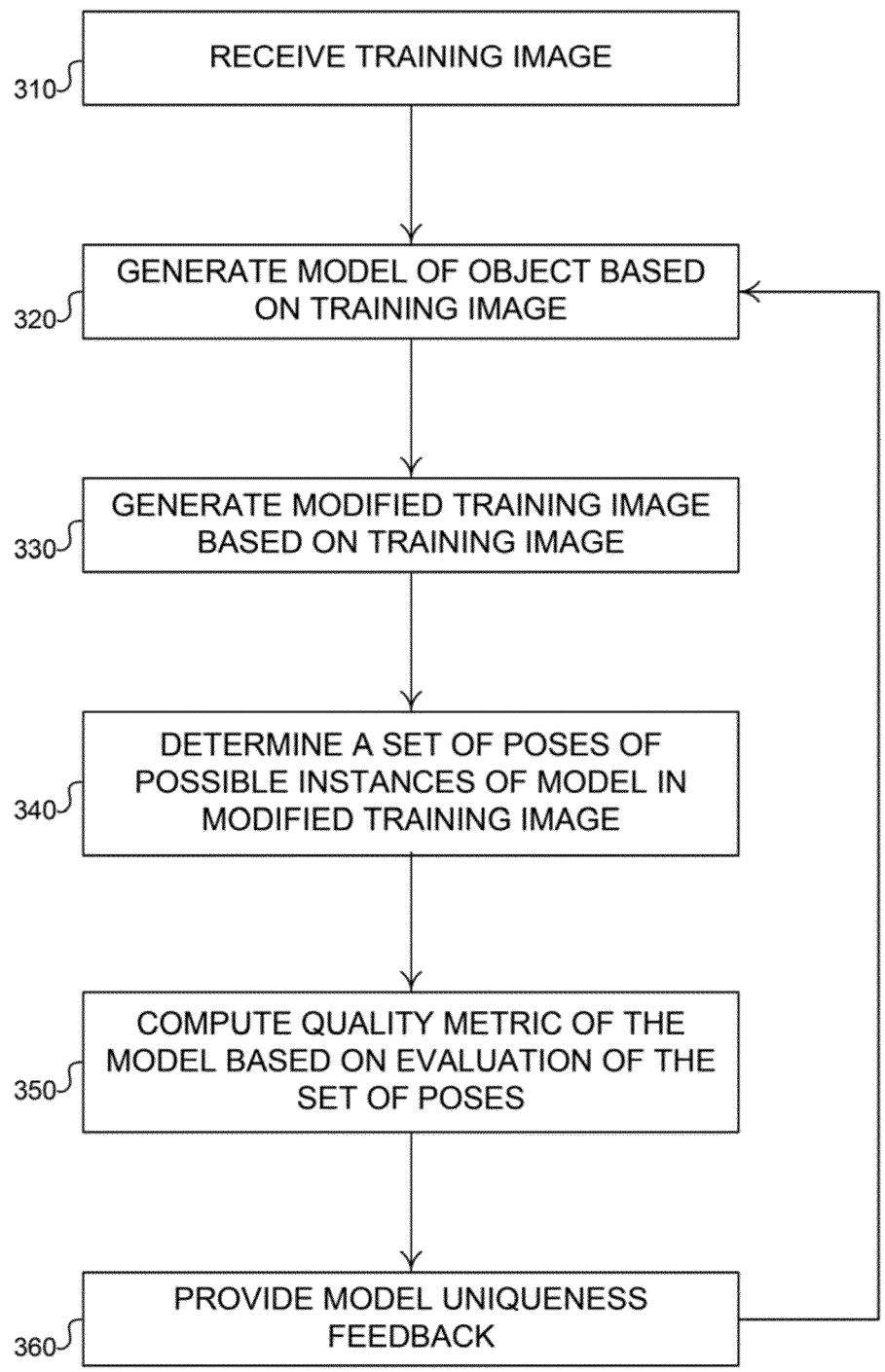
FIGS. 3A-3B illustrate flowcharts depicting general process flows for determining a quality metric of a model of an object in a machine vision application by perturbing a training image.

FIG. 3A illustrates a flowchart 300a depicting a general process flow for determining a quality metric of a model of an object in a machine vision application by perturbing a training image. The elements of flowchart 300a are described using the exemplary machine vision tool 200 of FIG. 2. Determining a quality metric of a model of an object in a machine vision application can include receiving a training image (310), generating a model of an object based on the training image (320), generating a modified training image based on the training image (330), determining a set of poses that represent possible instances of the model in the modified training image (340). computing a quality metric of the model based on an evaluation of the set of poses with respect to the modified training image (350), and/or providing feedback with respect to the uniqueness of the model (360).

In some embodiments, generating a model of an object based on the training image (320) includes, for example, manually generating the model (e.g., by drawing a box on a training image 230 with a mouse). In some embodiments, generating a model of an object based on the training image (320) includes, for example, processing the training image 230 to generate an edge-based representation of the object (either in image-based form or shape-based form).

Figure 3B:
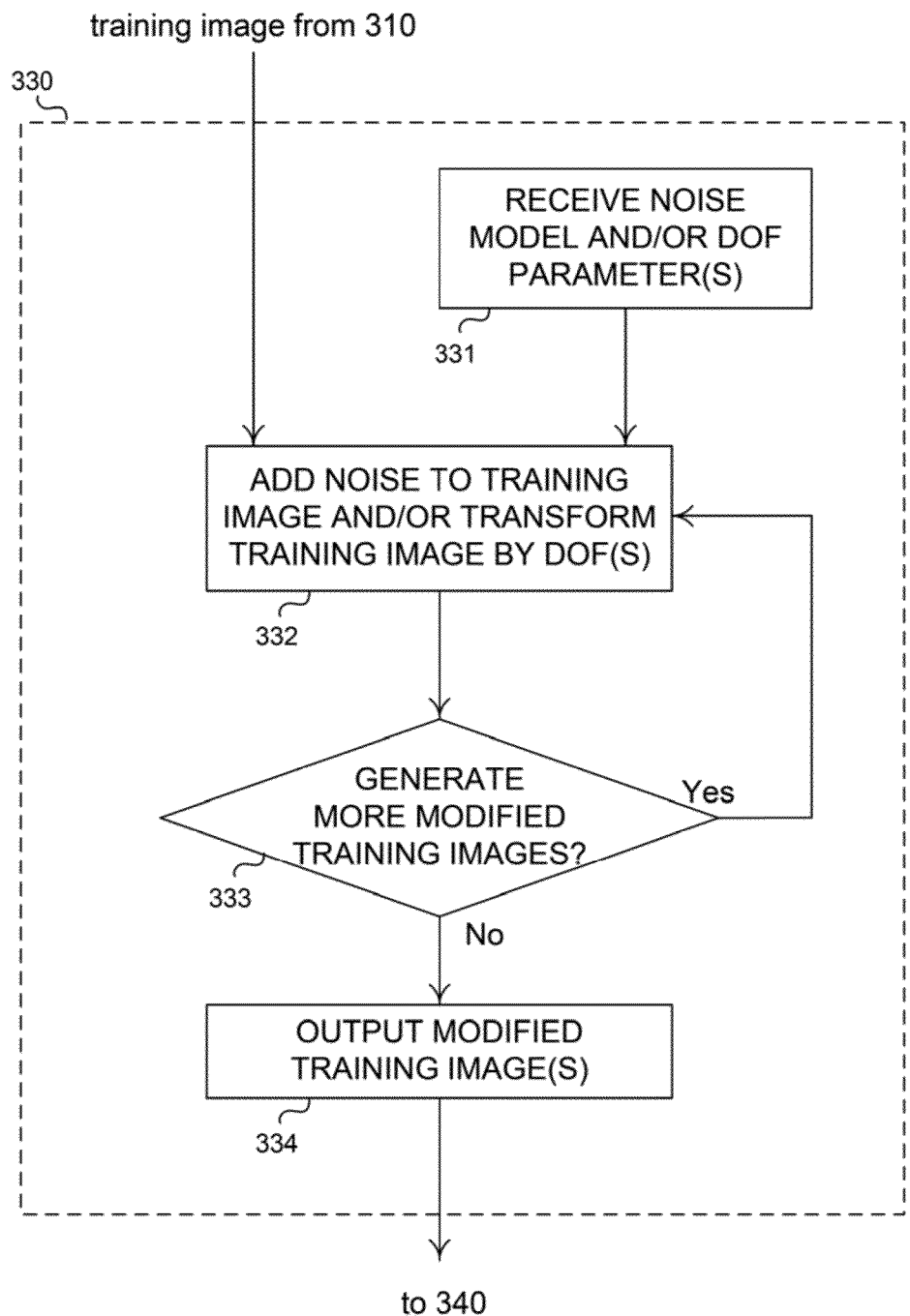

FIG. 3B illustrates a flowchart 300b depicting an exemplary process flow for generating a modified training image that includes receiving a noise model and/or DOF parameters (331), adding noise to the received training image based on the noise model and/or transforming the training image based on the DOF parameters (332), determining whether more modified training images should be generated (e.g., the number of different modified training images created can range from 20 to 1000) (333), and/or outputting the modified training images. Noise models can include Gaussian noise (e.g., Gaussian white noise with a specified constant mean and/or variance), local variance noise (e.g., zero-mean Gaussian white noise with an intensity-dependent variance), Poisson noise (e.g., Poisson noise generated from data instead of adding artificial noise to the data), salt and pepper noise (e.g., on and off pixels based on a specified noise density), speckle noise (e.g., multiplicative noise using the equation: modified image=original image+n*original image, where n is uniformly distributed random noise with mean 0 and variance v), amplifier noise, shot noise, quantization noise, film grain noise, non-isotropic noise, other randomly generated noise, or any combination thereof. In some embodiments, noise can be added to one or more pixels in the training image. The amount of noise can be related to brightness values (e.g., plus or minus 5 grey levels) or a percentage of brightness (e.g., 2%). In some embodiments, the amount of noise that most closely simulates the expected noise introduced during run-time can be used.

Transforming (332) the training image 201 can be with respect to one or more DOFs (e.g., rotation, translation, scale, skew, aspect ratio, or any combination thereof) and/or changing the resolution of the training image 230. In some embodiments, modified training images are transformed within an expected range of real life transformations that occur during run-time (e.g., the received (331) DOF parameters can specify a range of up to 360 degrees for rotation, +/−20 pixels for translation, 2% for scaling, etc.).

Modifying training images (e.g., through the addition of noise and/or transformation of the training image) and then determining poses of possible instances of the model in the training image advantageously simulates the run-time uniqueness of the model during the training stage. For example, the modified train images can effectively be treated as artificial or simulated run-time images, thereby allowing a user to perform a full analysis of the effectiveness of the model without any of the time constraints associated with acquiring a set of runtime images. In general, modification of the training images can increase the chance for secondary results to be detected by run-time module 220.

Determining a set of poses that represent possible instances of the model in the modified training image(s) (340) can include providing the generated model (320) and the modified training image(s) (330) to run-time module 240 in order to generate a set of poses 250 for each training image. The set of poses represent possible instances of the generated model (320) found by the run-time module 240 in a respective modified training image. For example, a set of poses can include each pose of a pattern found by run-time module 240 that satisfies a predetermined criterion (e.g., exceeds a threshold score).

The set of poses can be evaluated by assigning scores to one or more of the poses in the set of poses. The score of a particular pose can be calculated by the similarity of the run-time object and the model at the pose. There are many ways to define similarities. For example, similarity can be, roughly the ratio of the number of matched model edge features of the run-time objects to the total number of model edge features. Other similarity measures can be used. Each set of poses can include a first pose that is calculated to have a primary score (e.g., the highest calculated score from at least a portion of the set of poses) and a second pose that is calculated to have a secondary score (e.g., the second-highest calculated score from the portion of the set of poses).

Computing a quality metric of the model can be based on the score evaluations of the set of poses (350). In some embodiments, the quality metric is based on the primary score (e.g., the quality metric is the primary score) and/or the secondary score (e.g., the quality metric is the secondary score or the difference between the primary score and the secondary score). The quality metric can be based on a plurality of scores such as, for example, a distribution of the computed scores for a portion of the set of poses (e.g., the quality metric can be the average of scores or a standard deviation of the scores). In general, a low-quality metric indicates a model that is not unique, and a high quality metric indicates a model that is unique.

Providing feedback with respect to the quality metric (e.g., uniqueness) of the model (360) can include, for example, alerting the user via a user interface (e.g., a pop-up window) that the current model selected by the user is not a unique model or fails to satisfy a uniqueness criterion. In some embodiments, feedback can be provided in an automated system that generates models automatically. If the quality metric fails to satisfy a predetermined criterion, a new model can be generated based on the training image (320).

Figure 4:
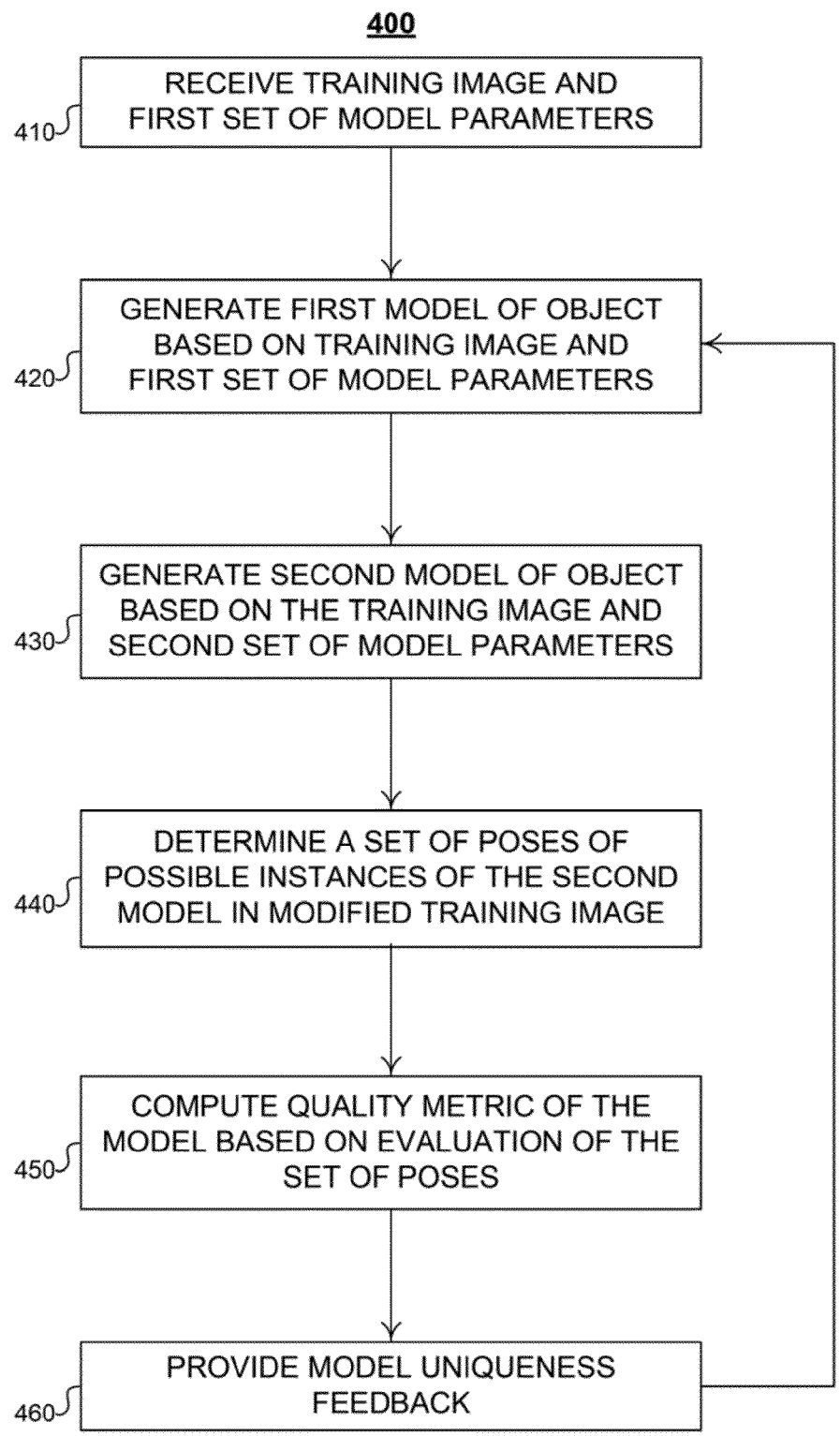
FIG. 4 illustrates a flowchart depicting a general process flow for determining a quality metric of a model of an object in a machine vision application by perturbing model parameters.

FIG. 4 illustrates a flowchart 400 depicting a general process flow for determining a quality metric of a model of an object in a machine vision application by perturbing model parameters. The elements of flowchart 400 are described using the exemplary machine vision tool 200 of FIG. 2. Determining a quality metric of a model of an object in a machine vision application can include receiving a first set of model parameters 410 and a training image (230), generating a first model of an object based on the training image and a first set of model parameters (420), generating a second model of the object based on the training image and a second set of model parameters modified from the first set of model parameters (430), determining a set of poses that represent possible instances of the second model in the training image (440), computing a quality metric of the first model based on an evaluation of the set of poses with respect to the training image (450), and/or providing feedback with respect to the uniqueness of the model (460). A plurality of models of the object can be generated based on the training image and sets of model parameters modified in different ways from the first set of model parameters.

In some embodiments, generating a first model of an object based on the training image (420) includes, for example, manually generating the model (e.g., by drawing a box on a training image 230 with a mouse. In some embodiments, generating a model of an object based on the training image (420) includes, for example, processing the training image 230 to generate an edge-based representation of the object (either in image-based form or shape-based form). With respect to generating the second model of the object (430), if the first model is based on a manually-selected region of interest of the training image, the second model can also be based on the same region of interest but using a different set of model parameters.

In general, training parameters 240 are used by training module 210 to generate the model 220. For example, in some embodiments, model parameters can include an elasticity parameter, a grain limit or granularity, a coarse-value accept fraction, a contrast threshold, an edge-value threshold, a trainClientFromPattern parameter, or any combination thereof. Table I below summarizes the model parameters and examples of how the parameters affect the generation of the models.

TABLE I

Model Parameters

| Model Parameter | Description |
| --- | --- |
| Elasticity | Specifies how elastic the model is. More elastic models can tolerate more deformation of the run-time objects. |
| Grain limit or granularity | Specifies how much the model is scaled down in the model matching stages. The model and the runtime objects are "downsized" and are matched in a smaller scale in a particular matching stage. The choice of the value of granularity can make the matching of the model with a candidate to be easier or to be more difficult, depending on the specific appearance of the model. |
| Coarse-value acceptance fraction | Specifies how the model selects matching candidate in a coarse stage. A higher value makes more candidates to be selected for a later-stage matching. |
| Contrast threshold | Specifies the threshold of the overall contrast of a candidate. A high value can cause low-contrast candidates to be disqualified in a matching stage. |
| Edge-value threshold | Specifies the threshold of the strength of individual edges of the run-time objects to be used for matching. A high value can cause weak edges to be disqualified for matching with the model |
| TrainClient-FromPattern | Specifies the transform from the model's coordinate system to the coordinate system that the user specifies at training. A change of the transform can slightly affect the appearance of the run-time objects and therefore cause different matching results |

In some embodiments, the first set of model parameters can be assigned default values. In some embodiments, the first set of model parameters can be modified from default values or values 240 provided to training module 210. Modifying a set of model parameters can include changing one or more values associated with one or more of the model parameters in the set. For example, some thresholds can be made slightly different from the default (e.g. edge-value threshold can be changed in +/−5 gray levels), which can make the candidates in the run-time image look different (e.g. fewer or more edges may be used in matching) than when the default is used, causing changed matching results. The trainClientFromPattern parameter can be changed slightly (e.g. +/−0.5 pixel in translation and +/−0.1 degree in rotation), making the candidates look slightly different and causing different matching results. Modifying model parameters and then determining poses of possible instances, in the training image, of models generated from the different sets of model parameters advantageously simulates the run-time uniqueness of the first model during the training stage. In general, modification of the model parameters can increase the chance for secondary results to be detected by run-time module 240.

Determining a set of poses that represent possible instances of the generated models in the training image (440) can include providing the generated models (e.g., the second model) and the training image to run-time module 220 in order to generate a set of poses 270 for each generated model. The set of poses represent possible instances of a generated model found by the run-time module 220 in the training image. For example, a set of poses can include each pose of a pattern found by run-time module 220 that satisfies a predetermined criterion (e.g., surpasses a threshold score).

Computing a quality metric of the first model can be based on the score evaluations of the set of poses (450), similar to the computation step (350) of FIG. 3. Providing feedback with respect to the quality metric (e.g., uniqueness) of the model (460) can include, for example, alerting the user via a user interface (e.g., pop-up window) that the current model selected by the user is not a unique model or fails to satisfy a uniqueness criterion. In some embodiments, feedback can be provided in an automated system that generates models automatically. If the quality metric fails to satisfy a predetermined criterion, a new first model can be generated based on the training image (320).

Figure 5:
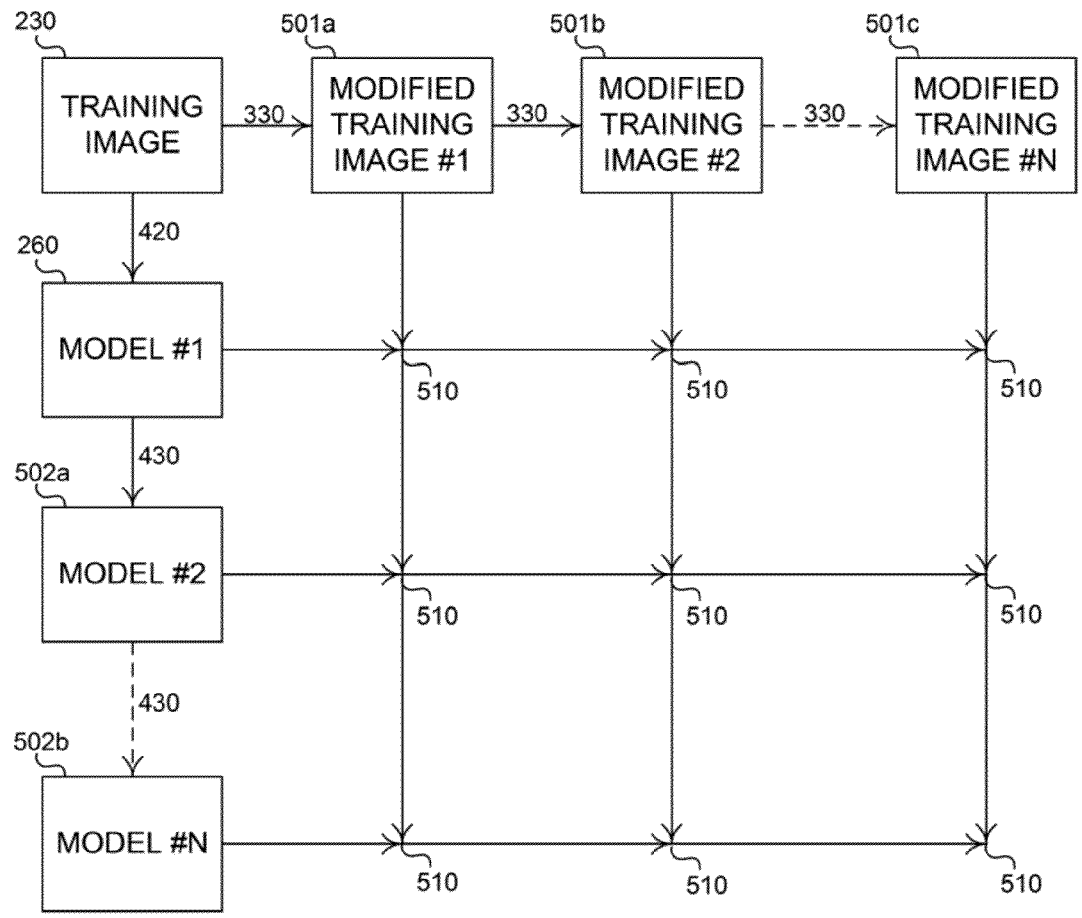
FIG. 5 illustrates a flowchart depicting a general process flow for determining a quality metric of a model of an object in a machine vision application by perturbing both a training image and model parameters.

In yet further embodiments, aspects of flowcharts 300a-300b and 400 can be combined. FIG. 5 illustrates a flowchart depicting a general process flow 500 for determining a quality metric of a model of an object in a machine vision application by perturbing both a training image and model parameters. One or more training images 501a-c can be modified (step 330 of FIG. 3) based on a baseline training image 230. In addition, one or more models 502a-b can be generated (step 440 of FIG. 4) based on training image 230 and a set of model parameters (not shown). Model #1 260 can be an original model for which a quality metric is being evaluated. A set of poses 510 of possible instances of the respective models 260 and/or 502a-b in the respective training images 501a-c can be determined (step 340)/(step 440). In some embodiments, the poses 510 for a single modified training image (e.g., modified training image #1 501a) are determined for one or more models 260 and/or 502a-b. In other embodiments, the poses 510 for a single model (e.g., model #2 502a) are determined for one or more modified training images 501a-c. In general, any predetermined or random set of poses 510 can be used to compute (350)/(450) the quality metric for model 260.

Different search parameters (e.g., a starting pose or search range parameters for one or more DOFs) provided to run-time module 220 can be modified. For example, a single training image 230 and a model 260 based on the training image 230 can be provided to run-time module 220, which performs multiple test runs against randomly perturbed search parameters. Modification of the search parameters can increase the chance for secondary results to be detected by run-time module 220. In general, sets of poses of possible instances of models can be determined for any combination of modified training images, different sets of model parameters used to generate the respective models, and/or different sets of search parameters used to perform the simulated run-time analyses.

Figure 6A:
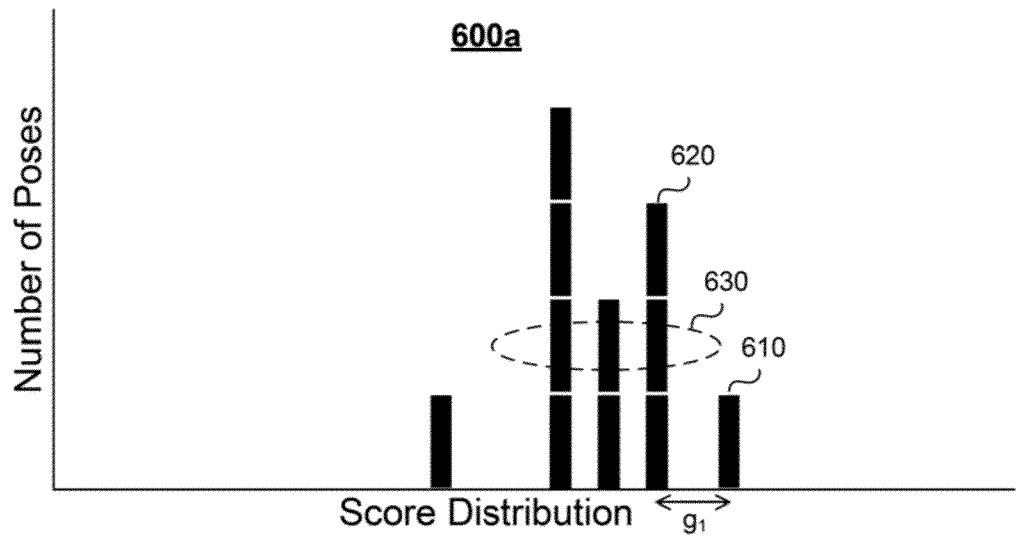
FIGS. 6A-6B illustrate graphs depicting examples of score distributions for a set of poses resulting from different models.
Figure 6B:
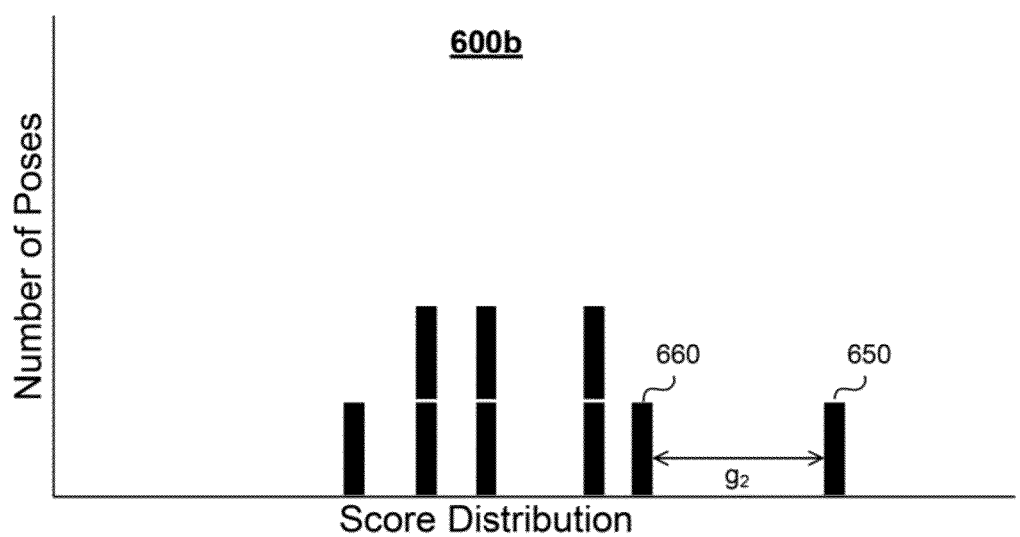

FIGS. 6A-6B illustrate graphs depicting examples of score distributions 600a-600b for a set of poses resulting from different models. Score distributions 600a-600b can be determined, for example, by steps (340) or (440) of FIGS. 3 and 4, respectively. Score distribution 600a illustrates an example of scores for a set of poses associated with a non-unique model. A low score of the "best" result 610 and/or a small gap $g_1$ between the "best" result 610 and the "second best" result 620 can indicate a poor uniqueness quality for the model used in determine these pose scores. For example, the bunched distribution of the scores 630 near the highest scoring pose 610 can indicate an increased risk of mis-detections and spurious results if the model were to actually be used during run-time. In addition, the small gap $g_1$ between the highest scoring pose 610 and the secondary results 630 also can indicate an increased risk of mis-detections and spurious results. Gap $g_1$ can be calculated, for example, to be the difference between the scores of the highest score 610 and the next-highest score 620, between the highest score 610 and an average of one or more secondary scores 630, or other combination of scores.

In contrast, score distribution 600b illustrates an example of scores for a set of poses associate with a unique model. A high score of the "best" result 650 and/or a large gap $g_2$ between the "best" result 650 and the "second best" result 660 can indicate a good uniqueness quality for the model used in determine these pose scores. For example, the large gap $g_2$ between the highest scoring pose 650 and the second-highest score 660 can indicate a decreased risk of mis-detections and spurious results if the model were to actually be used in run-time.

The above-described techniques can be implemented in digital and/or analog electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVI), HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks.

Carrier Ethernet can be used to provide point-to-point connectivity (e.g., new circuits and TDM replacement), point-to-multipoint (e.g., IPTV and content delivery), and/or multi-point-to-multipoint (e.g., Enterprise VPNs and Metro LANs). Carrier Ethernet advantageously provides for a lower cost per megabit and more granular bandwidth options. Carrier Ethernet shares the same basic MAC addressing and frame structure as classic Ethernet, but also can leverage certain physical layer specification and components (e.g., 10 and 100 Megabit, 1 and 10 Gigabit copper and optical interfaces). Other Carrier Ethernet aspects (e.g., tagging scheme, resiliency design, operations, administration and management (OAM)) have been optimized for carrier design requirements and operational practices. The result is a cost effective, flexible technology that can support building highly scalable and robust networks.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for determining a quality metric of a model of an object in a machine vision application, the method comprising:
   receiving a training image;
   generating a model of an object based on the training image;
   generating a modified training image based on the training image;
   determining a set of poses that represent possible instances of the model in the modified training image; and
   computing a quality metric of the model based on an evaluation of the set of poses with respect to the modified training image.

2. The method of claim 1 further comprising computing at least a primary score and a secondary score for at least a portion of the set of poses.

3. The method of claim 2 wherein computing the quality metric is based on the primary score and the secondary score.

4. The method of claim 2 wherein computing the quality metric is based on a distribution of the computed scores for the portion of the set of poses.

5. The method of claim 1 wherein the model comprises a geometric description of the object in the training image.

6. The method of claim 1 wherein the model comprises a portion of the training image.

7. The method of claim 1 wherein generating the modified training image comprises adding noise to the training image.

8. The method of claim 7 wherein the noise comprises amplifier noise, salt-and-pepper noise, shot noise, quantization noise, film grain noise, non-isotropic noise, or any combination thereof.

9. The method of claim 7 wherein the noise is added to one or more pixels in the training image.

10. The method of claim 1 wherein generating the modified training image comprises transforming the training image by one or more degrees-of-freedom of rotation, translation, scale, skew, aspect ratio, or any combination thereof.

11. The method of claim 1 wherein generating the modified training image comprises changing the resolution of the training image.

12. The method of claim 1 further comprising:
    generating a plurality of modified training images based on the training image; and
    determining a set of poses for each of the plurality of modified training images, each set of poses representing possible instances of the model in one of the plurality of modified training images;
    wherein computing the quality metric is further based on an evaluation of the sets of poses, determined from the plurality of modified training images, with respect to the modified training image.

13. The method of claim 12 further comprising computing at least primary scores and secondary scores for at least a portion of the set of poses and at least portions of each of the sets of poses computed from the plurality of modified training images.

14. The method of claim 13 wherein computing the quality metric of the model is based on the secondary scores.

15. The method of claim 13 wherein computing the quality metric of the model is based on a distribution of the computed scores for the portion of the set of poses and distributions of the computed scores for the portions of the sets of poses computed from the plurality of training images.

16. The method of claim 1 further comprises modifying a baseline model parameter, wherein generating the model is based on the modified baseline model parameter.

17. The method of claim 16 wherein the baseline model parameter comprises an elasticity parameter, a grain limit or, granularity, a coarse-value acceptance fraction, a contrast threshold, an edge-value threshold, trainClientFromPattern or any combination thereof.

18. A computer program product, tangibly embodied in a non-transitory machine-readable storage device, the computer program product including instructions being operable to cause a data processing apparatus to:
receive a training image;
generate a model of an object based on the training image;
generate a modified training image based on the training image;
determine a set of poses that represent possible instances of the model in the modified training image; and
compute a quality metric of the model based on an evaluation of the set of poses with respect to the modified training image.

19. A system for determining a quality metric of a model of an object in a machine vision application, the system comprising:
interface means for receiving a training image;
model generating means for generating a model of an object based on the training image;
image modifying means for generating a modified training image based on the training, image;
processor means for determining a set of poses that represent possible instances of the model in the modified training image; and
processor means for computing a quality metric of the model based on an evaluation of the set of poses with respect to the modified training image.

20. A machine vision system for determining a quality metric of a model of an object in a machine vision application, the system comprising:
an interface for receiving a training image;
a model generating module for generating a model of an object based on the training image;
an image processing module for generating a modified training image based on the training image;
a run-time module for determining a set of poses that represent possible instances of the model in the modified training image; and
a quality-metric module for computing a quality metric of the model based on an evaluation of the set of poses with respect to the modified training image.

* * * * *